United States Patent [19]

Logan

[11] Patent Number: 5,160,716
[45] Date of Patent: * Nov. 3, 1992

[54] PROCESS FOR MAKING HIGHLY REACTIVE SUB-MICRON AMORPHOUS TITANIUM DIBORIDE POWER AND PRODUCTS MADE THEREFROM

[75] Inventor: Kathryn V. Logan, Roswell, Ga.

[73] Assignee: Georgia Tech Research Corporation, Atlanta, Ga.

[*] Notice: The portion of the term of this patent subsequent to Dec. 19, 2006 has been disclaimed.

[21] Appl. No.: 399,329

[22] Filed: Aug. 28, 1989

Related U.S. Application Data

[63] Continuation-in-part of Ser. No. 903,265, Sep. 3, 1986, Pat. No. 4,888,166.

[51] Int. Cl.$^5$ .............................................. C01B 35/04
[52] U.S. Cl. .................................................... 423/297
[58] Field of Search ........................................ 423/297

[56] References Cited

U.S. PATENT DOCUMENTS

| | | | |
|---|---|---|---|
| 2,678,870 | 5/1954 | Cooper | 423/297 |
| 2,735,155 | 2/1956 | Glaser | 423/297 |
| 2,906,605 | 9/1959 | Dubeck | 423/297 |
| 4,108,670 | 8/1978 | Steiger et al. | 423/297 |
| 4,282,195 | 8/1981 | Hockje | 423/297 |
| 4,374,903 | 2/1983 | Intrater et al. | 428/627 |
| 4,503,021 | 3/1985 | Brynestad et al. | 423/297 |
| 4,812,425 | 3/1989 | Walker, Jr. | 423/297 |
| 4,888,166 | 12/1989 | Logan | 423/297 |

OTHER PUBLICATIONS

Takahashi et al., "Chemical Vapor Deposition of Titanium Diboride", Journal of Crystal Growth, vol. 26, 1974, pp. 203–209.

Primary Examiner—Jeffrey E. Russel
Attorney, Agent, or Firm—Hurt, Richardson, Garner, Todd & Cadenhead

[57] ABSTRACT

A material of manufacture comprising sub-micron particulate amorphous titanium diboride formed by a process which comprises the steps of forming a powdered reaction mixture of titanium oxide, boron oxide and magnesium, exothermically reacting the reaction mixture in an atmosphere including air to yield a reacted mass containing titanium diboride and magnesia, leaching the reacted mass with a leaching solution having a pH in the range of about 0.5 to about 8, and recovering from the leaching solution sub-micron titanium diboride having a surface area of from about 25 to about 49 $m^2/gm$; and a material of manufacture resulting from the hot pressing of the sub-micron particulate titanium diboride material of this invention which has a hardness of from about 2800 to about 3400 Knoop, an elastic modulus from about 700 to about 813 GPa, a forming temperature of from about 1500° C. or less, and a grain morphology aspect ratio of from about 2:1 to about 100:1.

5 Claims, 5 Drawing Sheets

PROCESS FOR MAKING HIGHLY REACTIVE SUB-MICRON AMORPHOUS TITANIUM DIBORIDE POWER AND PRODUCTS MADE THEREFROM

This invention was made with government support under Contract Number DAAG46-84-C-0059 awarded by the Department of the Army. The government has certain rights in this invention.

CROSS-REFERENCE TO RELATED APPLICATION

This application is a continuation-in-part of this inventor's pending application Ser. No. 06/903,265, filed on Sep. 3, 1986, now U.S. Pat. No. 4,888,166.

BACKGROUND OF THE INVENTION

This invention relates to the production of titanium diboride and is directed to an improved highly reactive, non-pyrophoric, sub-micron amorphous and/or crystalline titanium diboride powder, and coatings, layers, components, and monolithic shapes made therefrom.

A variety of methods have been developed for producing metal boride powders such as titanium diboride, as follows:

1. Direct combination of the metal with boron or a metal hydride and boron.
2. Hydrogen reaction of a boron halide with a metal source such as an oxide.
3. Electrolysis of a melt consisting of a metal oxide, boron oxide, and an alkali flux.
4. Reduction of a metal oxide with boron (borothermic) or co-reduction with oxide by carbon (carbothermic).
5. Reduction of oxides by metals.
6. Arc-plasma reaction from vapor reactants.

Methods 1-3 are used mainly in laboratory experimentation. Method 4 has been employed commercially but the borothermic method requires large amounts of boron over what the final product contains and is thus too wasteful for high production levels. The carbothermic method, however, is the one generally used to commercially produce titanium diboride. In this method, the raw materials are heated to a temperature in the range of 1800°-2000° C. until titanium diboride is formed. The powdered titanium diboride ultimately recovered requires forming temperatures in about this same range. Method 5 has been attempted but found to produce contaminants of other borides as well as borates and titanates, and has not been considered a commercially viable method. Method 6 produces pyrophoric titanium diboride from expensive reagents.

The principle disadvantages of the above methods are, for 1, expensive raw materials and the likelihood of formation of potentially explosive boranes; for 2-4, expensive raw materials and reaction vessels; for 5, production of contaminant borides, borates and titanates; and for 6, expensive raw materials, reaction vessels and formation of pyrophoric titanium diboride.

The carbothermic method, method 4, is currently being used commercially to produce relatively large grained, crystalline titanium diboride. High temperatures (1800°-2000° C.) are required in the processing; and in order to obtain the product in sub-micron size, final grinding, a source of contamination, is also required. The resultant powdered, sub-micron titanium diboride is crystalline (hexagonal), low in surface area (6 m$^2$/gm BET), and is difficult to sinter and form into dense shapes. The powder must be vacuum sintered at 2200° C. or hot pressed under high pressure at 1800°-2200° C. Even at carefully controlled processing conditions, micro-stresses are caused by grain growth and thermal expansion of individual crystallites by different amounts in the a and c directions.

Another titanium diboride material disclosed by Byrnestad, U.S. Pat. No. 4,503,021, is an ultra-fine material with a particle size of less than 1/10 of a micron. However, this material has a relatively small surface area and is highly pyrophoric. Other disadvantages of the Byrnestad material include the need for relatively high temperature and pressure in forming dense shapes by hot pressing or sintering. Additionally, the dense shape formed from the Brynestad material has a relatively large grain size, a relatively low modulus of rupture and a relatively low elastic modulus.

A Japanese titanium diboride, Japanese Pat. No. 089363, is a non-pyrophoric material having a grain size of less than 2.5 microns; however, the Japanese material is produced by using an excess of MgO in the raw materials to control the violent reaction. The resulting MgO/TiB$_2$ powder is purified by using chloride based leach solutions which can result in a chlorine-contaminated final product. Additionally, the raw materials must be ball milled together prior to reaction, a process which along with adding impurities from the milling process adds extra time and expense. The resultant TiB$_2$ must be ultra-centrifuged to remove the supernatant liquid, another processing step adding to the cost. A further disadvantage of the Japanese product is the need to form the product in an inert atmosphere (argon), thus also adding expense.

SUMMARY OF THE INVENTION

In accord with this invention, a highly reactive, non-pyrophoric sub-micron titanium diboride powder of variable crystallinity (amorphous to crystalline) and purity, dependent on control of processing parameters, and MgO are produced in situ from a self-propagating exothermic reaction mixture (which is leached to remove the MgO), thereby eliminating the need for grinding, and attaining, for the first time it is believed, sub-micron titanium diboride powder of highly reactive, non- pyrophoric form. By "highly reactive" is meant sufficient reactivity to significantly decrease the temperature required for forming dense, non-porous structures. Products of this invention may be formed into dense structures by hot pressing at temperatures in the range of 1300°-1500° C., as opposed to the normally required range of 1800°-2200° C., or, feasibly, formed into a layer or coating by melt spraying onto a suitable substrate.

A process parameter which affects whether, or the degree to which the resultant product is amorphous, is the rapidity with which the powder is formed and cooled after the exothermic reaction and the ability to suspend the powder during the reaction preventing localized agglomeration, sintering and grain growth.

The purity of the product, e.g., the absence of other borides, borates and titanates therein, is strongly dependent upon control of the weight amounts of the components of the reaction mixture. The absence of borates and titanates formed during the leaching step also is strongly dependent upon the pH control and temperature of the leaching solution. It has been found that if the temperature of the leaching solution is kept at about 90° C. and the pH between 2.5 and 4, the best results are obtained. It also has been found that if the magnesium and the boron oxide are present in amounts of about 5-30% in excess of stoichiometric in the reaction mixture, other boride, borate and titanate formation will be minimized. When the magnesium and boron oxide are present in excess of stoichiometric, the best results are attained.

The process producing this invention appears inherently to provide the titanium diboride in sub-micron, highly reactive, non-pyrophoric form and is practiced successfully when the reducing metal of the exothermic reaction is magnesium.

Accordingly, it is an object of this invention to provide a titanium diboride material of variable crystallinity and high purity which is also highly reactive and non-pyrophoric.

It is another object of this invention to provide a titanium diboride material which can be hot-pressed or sintered into a highly dense shape at a temperature lower than that required of known titanium diboride materials.

It is a further object of this invention to provide a titanium diboride material which is non-pyrophoric, sub-micron in size and has a relatively large surface area.

It is another object of this invention to provide a titanium diboride material which can be formed into a dense shape having an elongated intermeshed microstructure.

It is yet another object of this invention to provide a dense form of titanium diboride material which has extreme impact, corrosion, temperature and wear resistance characteristics.

These and other objects of the invention will become apparent as this description proceeds.

DETAILED DESCRIPTION OF THE INVENTION

Figure 3:
FIG. 3 is an electron micrograph of the product obtained by this invention.
Figure 4A:
FIG. 4(a) is an electron micrograph of the carbothermic product with a side-by-side comparison with an electron micrograph of the product of this invention, FIG. 4(b).
Figure 4B:
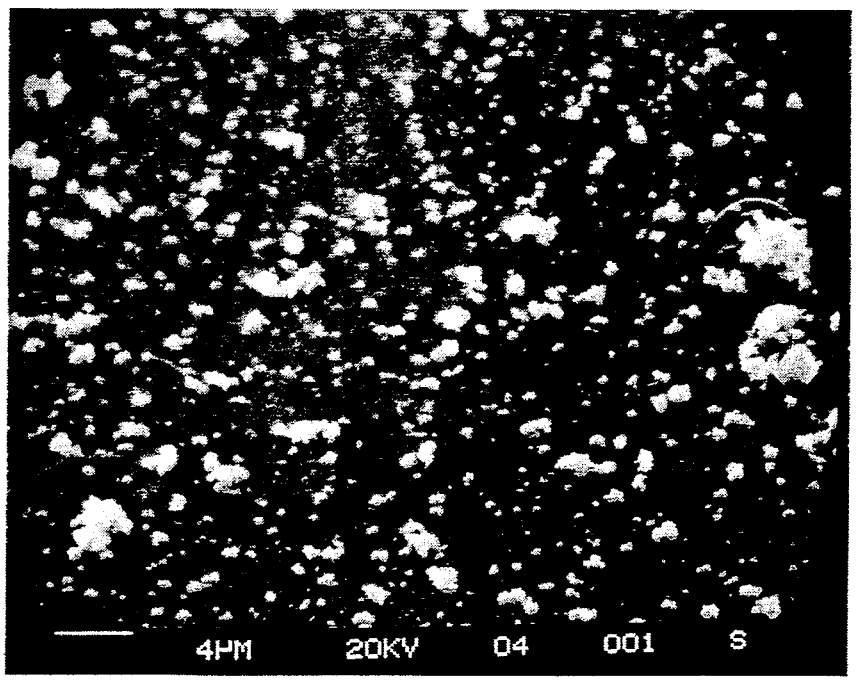

The titanium diboride powder contemplated by the best mode of this invention has a variable crystallinity, ranging from an amorphous to crystalline structure. The particle size of the powder is sub-micron, that is less than 1 micron (FIG. 3), and has a surface area of greater than about 25 $m^2/g$. FIG. 4(a) is an electron micrograph of the carbothermic product with a side-by-side comparison with an electron micrograph of the product of this invention shown in FIG. 4(b). The magnification of both FIGS. 4(a) and 4(b) is 5000×. Table I contains values for pertinant characteristics of this invention along with a comparison with three of the known titanium diboride materials.

TABLE I

| | POWDER PROPERTIES | | | |
| PROPERTIES | APPLICANT | JAPANESE | BRYNESTAD | CARBOTHERMIC |
| --- | --- | --- | --- | --- |
| 1. RAW MATERIALS | inexpensive $TiO_2/B_2O_3/$ Mg | $TiO_2/B_2O_3/$ Mg/MgO (Ball Mill) | expensive $TiCl_4/BCl_3/$ $H_2$ (sol/gases) | $TiO_2/B_4C/C$ |
| 2. LEACHING | $HNO_3$ | $NH_4Cl$, HCl | | |
| 3. TEMPERATURE | room temp | 650-1000° C. | | |
| 4. ATMOSPHERE | air | argon | | |
| 5. PARTICLE SIZE | 1.0 micron | 2.5 micron | .001-.1 micron | 2-10 microns |
| 6. PYROPHORIC? | No | | Yes | No |
| 7. CRYSTALLINITY | Amorphous/Crystalline | Crystalline | Amorphous/Crystalline | Crystalline |
| 8. SURFACE AREA | 25-49 $m^2/gm$ | | 7 $m^2/gm$ | 7 $m^2/gm$ |
| 9. PRODUCT CHEMISTRY main component trace comps. | $TiB_2/MgO$ borate/titanate other borides | $TiB_2/MgO$ + Cl | $TiB_2$ Cl | $TiB_2$ $TiO_2/B_2O_3$ C/O carbides |

The hardness of a dense hot-pressed product formed from the titanium diboride material of this invention ranges from about 2800 to about 3400 Knoop, the elastic modulus ranges from about 700 to about 813 Gpa, and the forming temperature ranges from about 1300° C. to about 1500° C. The aspect ratio of the grains in a dense shape produced from the powder of this invention can range from about 2:1 to about 100:1 or more (l/d) depending on the densification heat treatment.

A sample dense shape formed of the titanium diboride powder of the present invention was tested to determine various characteristics. A three-eights inch ($\frac{3}{8}$") thick disc with an outer diameter of one and one-quarter inches ($1\frac{1}{4}$") was formed by subjecting the material to a temperature of 1400° C. at 100 psi for 2 hours. The resulting dense shape had a nominal density of 100% $p_t$, a modulus of rupture of 450 MPa, a toughness of 5.5 MPa/m, an elastic modulus of 813 GPA, and a hardness of 3400 Knoop. The size of the titanium diboride grains was about 10-15 microns with an elongated microstructure or morphology having an aspect ratio of about 10:1 (l/d). FIG. 5(b) is an electron micrograph (magnification=100×) of the microstructure of the dense shape material formed of the titanium diboride powder of the present invention.

Table II contains values for pertinent characteristics of this sample dense shape along with a comparison with two of the known titanium diboride material dense shapes. Values for the characteristics listed in Table II are well known in this field, as shown by Baumgartner, H. R. and Steiger, R. A., Sintering and Properties of Titanium Diboride Made from Powder Synthesized in a Plasma-Arc Heater, Journal of the American Ceramic Society, 67 [3], 207-11 (1984), and Ferber, M. K., Becher, P. F., and Finch, C. B., Effect of Microstructure on the Properties of $TiB_2$ Ceramics, Communications of the American Ceramic Society, C-2-3 (1983), which are incorporated herein by this reference.

TABLE II

| | DENSE SHAPE PROPERTIES | | |
|---|---|---|---|
| PROPERTIES OF SAMPLE DENSE SHAPES | GTRI | BRYNESTAD | CARBOTHERMIC |
| 1. SAMPLE SIZE | disk, $\frac{3}{8}''$ $1\frac{1}{4}''$ OD | one gram | |
| 2. FORMING TEMP | 1400° C. | 1600° C. | 2000° C. |
| 3. FORMING PRES | 100 psi | 4500 psi/35 MPa | |
| 4. FORMING TIME | 2 hours | | |
| 5. DENSITY | 100% p | 98% p | 98% p |
| 6. GRAIN SIZE | 10-15 microns | 80 micron | 4.5-40 microns |
| 7. MORPHOLOGY | L/D = 10/1 (elongated) | | equiaxed |
| 8. CHEMISTRY | $TiB_2$ | | $TiB_2/TiC$ grain boundaries |
| 9. MOD OF RUPT | 450 MPa | 325 MPa | 425 MPa |
| 10. TOUGHNESS | 5.5 MPa/m | 5.0 MPa/m | 5.75 MPa/m |
| 11. ELASTIC MOD | 813 GPa | 540 GPa | 540 GPa |
| 12. HARDNESS | 3400 Knoop | | 2400 Knoop |

Figure 5A:
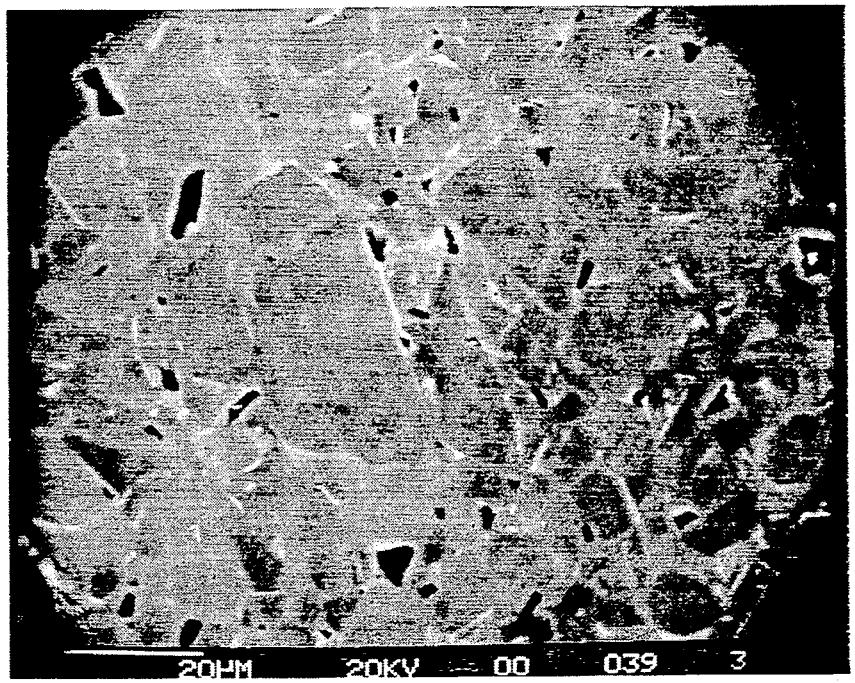
FIG. 5(a) is an electron micrograph of the microstructure of the dense shape material produced from the powder of the carbothermic process.
Figure 5B:
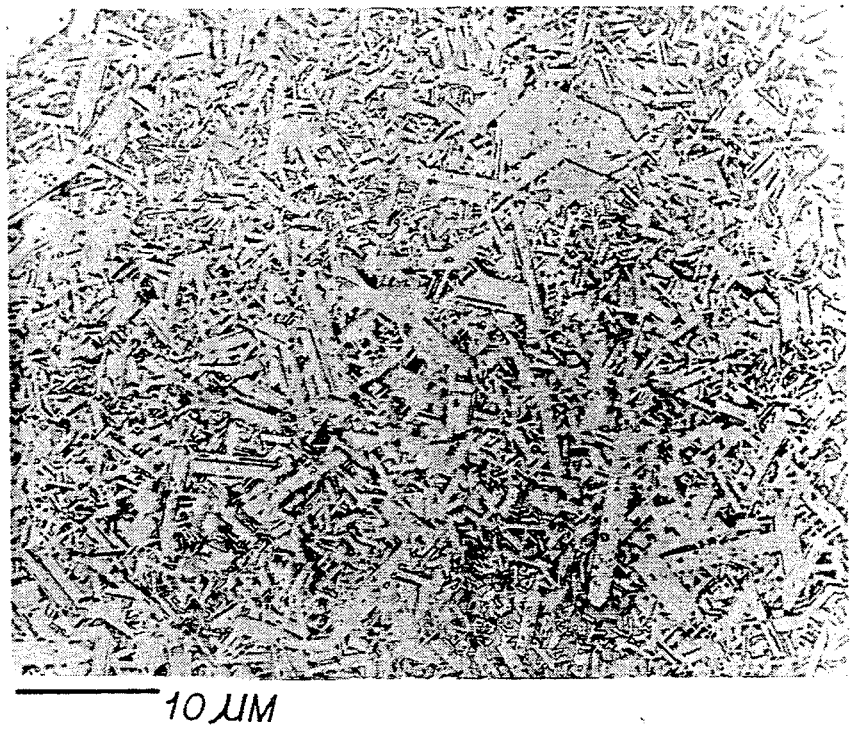
FIG. 5(b) is an electron micrograph of the microstructure of the dense shape material produced from the powder of this invention.

In contrast to the microstructure, FIG. 5(b), resulting from hot pressing the $TiB_2$ powder of my present invention is the microstructure shown in FIG. 5(a) resulting from hot pressing the carbothermic powder product. The product shown in FIG. 5(a) was formed by hot pressing at 2000° C. and at the conditions listed in Table II. It is seen that the resultant grain morphology from hot pressing the carbothermic powder product, having equiaxed grains and titanium carbide grain boundaries (as evidenced from the lighter shaded areas surrounding the grains) is radically different from the hot pressed product of my invention. In forming a dense shape by hot pressing the titanium diboride powder of the present invention, the process parameters of temperature, pressure and time are dependent upon the shape of the article to be formed. By employing my titanium diboride powder, these process parameters may be substantially reduced over the corresponding pressure, temperature and time required to form a dense shape from the carbothermic powder product referred to herein. Generally, dense shapes may be formed from my titanium diboride powder at temperatures at about 1500° C. or lower, at pressures in the range of about 100 to about 6000 psi and over a time period of about 2 to about 4 hours.

Hot pressing is not the only technique which may be employed to form a dense shape from my titanium diboride powder. The reduced temperature requirement for densification of my powder allows for formation of a dense shape by, for example, pressureless sintering or other known densification processes.

In forming the titanium diboride powder of this invention, it is not necessary to mill the raw materials together prior to reaction. However, the selection of the leaching solution will affect the resultant grain morphology of the formed dense shape. Titanium diboride powder products may be formed employing either HCl or $NH_4Cl$ in the leaching solution resulting in chlorine/chloride contamination of the final powder product and the product being pyrophoric. The use of nitric acid as the leaching solution, on the other hand, seems to encourage grain growth on densification of my titanium diboride powder. Further, nitric acid results in a purer final product, free from contaminants such as chlorine/chloride associated with other titanium diboride materials. Selection of sulfuric acid as the leaching solution conversely seems to inhibit grain growth. Accordingly, control of resultant grain morphology and size on densification of my titanium diboride powder may be achieved through appropriate selection of the leaching solution.

An anatase $TiO_2$ raw material is used in the process forming the $TiB_2$ of this invention which is believed may be an additional cause of the formation of the unique microstructure of this invention. Additionally, Mg flake raw material is used to avoid the risk of explosion inherent in the use of atomized Mg powder. Lastly, the reaction producing the $TiB_2$ of this invention is carried out safely in an air atmosphere unlike known $TiB_2$ production reactions which occur in an inert atmosphere. The process for producing the $TiB_2$ powder of this invention is described in more detail in the following examples.

EXAMPLE 1

Stoichiometric amounts of $TiO_2$, $B_2O_3$ and Mg, each of particle size to pass 50 mesh (US Standard Mesh) were mixed to provide the thermite type exothermic reaction mixture. The reaction mixture was ignited in air at atmospheric pressure by local heating with nichrome wire. Upon ignition, the reaction proceeded vigorously in a self-propagating manner to completion. The reaction products were found to contain MgO, other borides, borate and titanate contaminants, although the titanium diboride was present in sub-micron, highly reactive form.

EXAMPLE 2

Stoichiometry as in Example 1 was varied over the range of about 5% to about 30% excess of Mg and $B_2O_3$ in a series of Examples and it was discovered that the amounts of the contaminants in the form of other borides, borates and titanates were reduced. An excess of about 10% of the above metal and oxide was found to produce the least amounts of these contaminants in 100 gm batches. The excesses were adjusted whenever the ignition batch size was changed.

EXAMPLE 3

Products obtained in accord with Examples 1 and 2 were leached with a dilute $HNO_3$ solution to remove the magnesium oxide resulting from the exothermic reaction. It was found that if the solution is allowed to be extremely acidic (less than about pH 0.5) titanates would form rapidly. Whereas, if the solution is allowed to be alkaline (pH of more than about 8.0), borates would form rapidly.

The relative success of the acid wash was visually apparent from the relative "grayness" of the recovered powder. Light gray indicated that the recovered powder contained contaminants of $TiO_2$. Black powder indicated the presence of borates and titanates. A dark gray color indicated that the recovered powder was largely or substantially completely a mixture of amorphous and crystalline titanium diboride.

The powders recovered after acid wash were so fine that it was necessary to recover them by ultra centrifuge and then filtering the suspension. However, the suspension was found to flocculate at a pH of 2.5-4.0 tending to cause the titanium diboride particles to easily settle out of the suspension, therefore ultra-centrifuging was not necessary to recover the powder at this adjusted pH. It was found that initially the acid should be kept within about 5-10% $HNO_3$ concentrations to attain best recovery of the titanium diboride.

Figure 1:
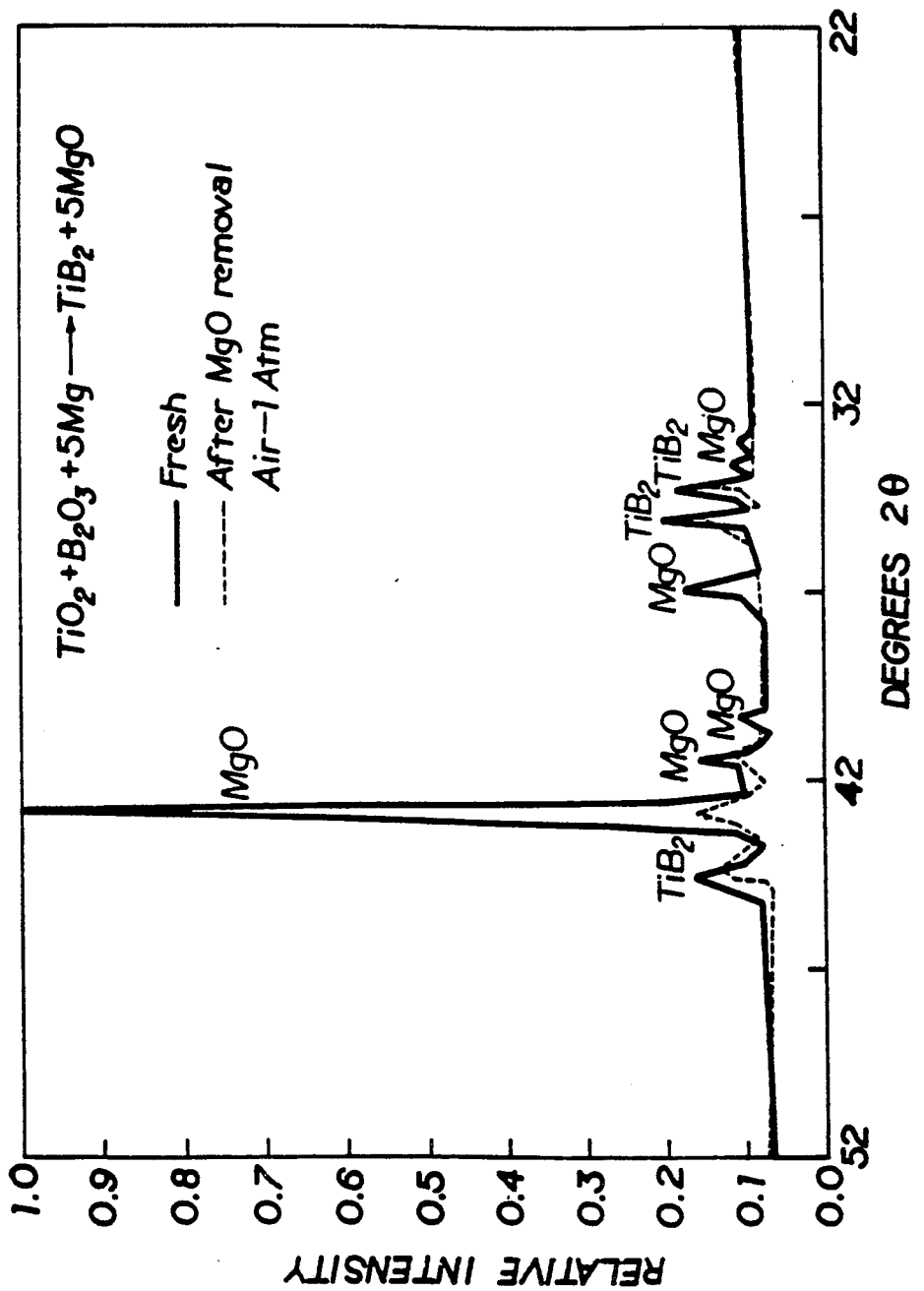
FIG. 1 is an X-ray diffraction chart of the product obtained by this invention

An X-ray diffraction chart as in the drawing, FIG. 1, revealed that the reaction products are magnesium oxide and titanium diboride, apparently poorly crystallized. Electron microprobe analysis of the leached product revealed that it contained 98.6% pure titanium diboride, and EDXRA of individual particles showed no magnesium remaining. Preliminary transmission electron microscopy revealed irregular morphology particles 1 micron size or less. Selected area diffraction (SAD) of single particles showed no defined crystallinity of the majority of particles analyzed. Since X-ray diffraction (and SAD) are dependent on relative crystallinity, the powdered product of this invention clearly appears to be amorphous.

The degree to which the highly reactive powder of this invention is amorphous has been found to be dependent in part upon the rapidity with which the reaction products are cooled. Thus, where a large mass of the reaction mixture is ignited and the reaction has gone to completion, it is important to prevent localized sintering by suspending the particles and to quench the reaction product immediately, or otherwise to increase the rate of cooling to ambient temperature. If the powder is allowed to remain in the reaction vessel, crystallinity and grain growth occur. The suspension and rapid quenching of the reaction product produces a sub-micron, substantially amorphous powder.

EXAMPLE 4

Figure 2:
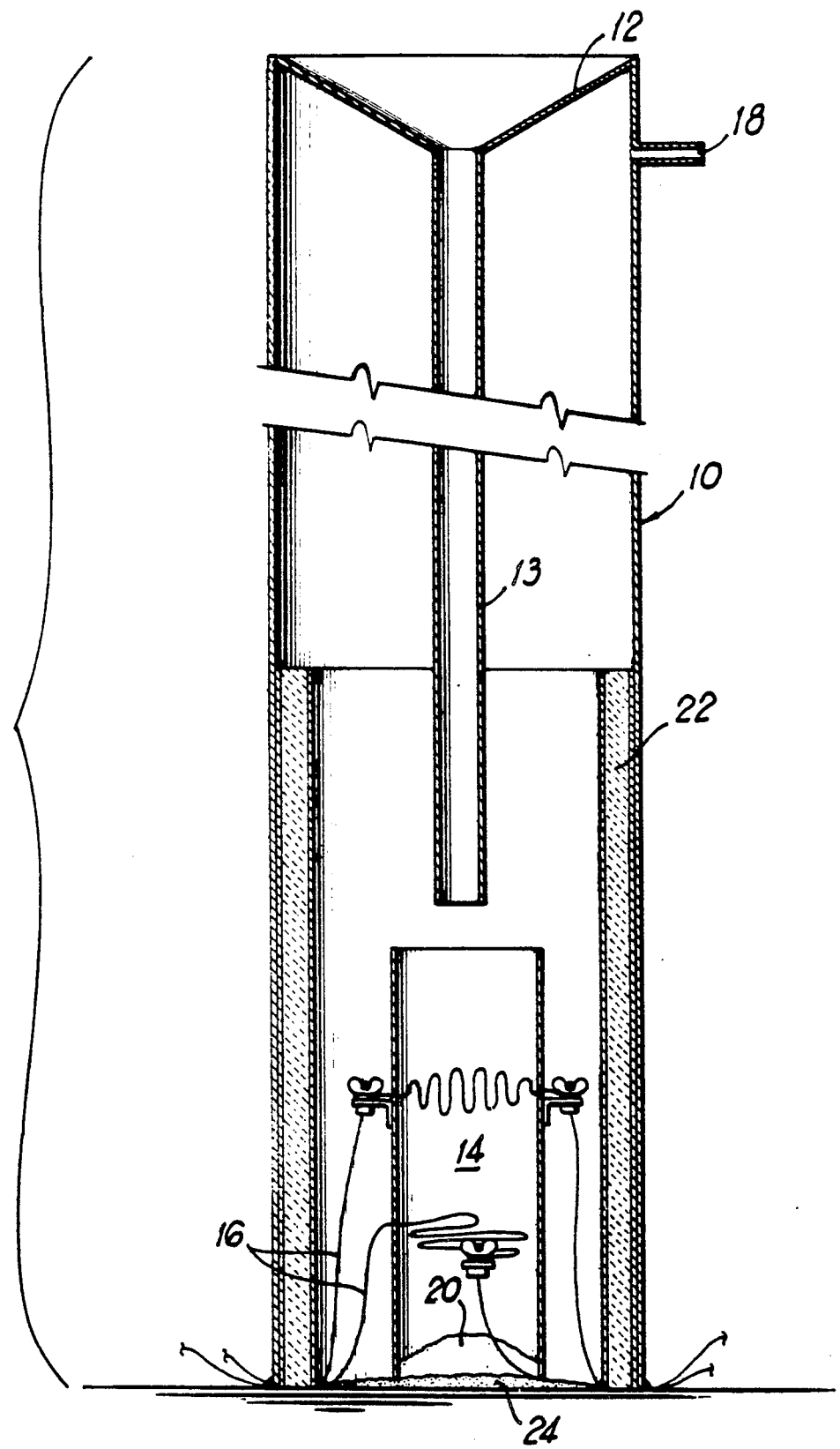
FIG. 2 is an illustration of a continuous processing method of the present invention.

In an attempt to suspend the particles during the reaction thus achieving rapid quenching and preventing local sintering and grain growth, a continuous processing method was developed. FIG. 2 illustrates the continuous processing method which comprises a column 10 designed so the raw materials could be gravity fed through a funnel 12, a glass tube 13 and into a hot zone 14 created by resistance heated hot wires 16, 16. The raw materials ignited producing a sub-micron product which escaped as a smoke out of the opening 18 in the top of the column 10 as well as a recovered $TiB_2$/MgO product 20 at the base of the column 10 which was comparable to the product in Example 2.

Metal and refractory wool insulation 22 was used around the hot zone 14 and MgO was used as insulation 24 at the base of the column 10. The column technique was noted to be a possible continuous processing technique. The recovered product was leached as in Example 3 above.

The high reactivity of this invention allows the titanium diboride material with unique microstructure to be formed, by hot press means or otherwise, into many different components useful in as many different applications. One important class of applications involves components formed of this material to be used in extreme environments such as high temperature, highly corrosive, highly abrasive, or high impact environments or the like. For example, this material is particularly well-adapted for wear parts such as bearings and dies such as wire dies, impact parts such as bumpers and engine components, and thermally-subjected parts that experience extreme rapid changes in temperature such as cuicibles.

The $TiB_2$ of this invention is also well-suited for electrical applications such as electrodes or semi-conductor device substrates such as semi-conductor barrier substrates, high abrasion parts such as cutting tools, abiasials and grinding and polishing materials, and laser hardening materials. This material also is highly corrosion resistant and can be used in extremely corrosive environments.

Although the invention has been presented in considerable detail for the purpose of illustration in the above description and examples, they are not intended to limit the invention of this application, which is as defined in the claims below.

I claim:

1. A material of manufacture predominantly comprising non-pyrophoric sub-micron particulate titanium diboride, said material being formed by a process which comprises the steps of:
   (a) forming a powdered reaction mixture comprising titanium oxide, boron oxide, and magnesium;
   (b) exothermically reacting in a self-propagating reaction, the reaction mixture in an atmosphere including air to yield a reacted mass containing titanium diboride and magnesia;
   (c) leaching the reacted mass with a leaching solution having a pH in the range of about 0.5 to about 8; and
   (d) recovering non-pyrophoric sub-micron particulate titanium diboride powder of highly reactive form having an average particle size of one micron or less from the leaching solution.

2. The material of manufacture as described in claim 1, wherein said material is amorphous sub-micron titanium diboride.

3. The material of manufacture as described in claim 1, wherein said material is crystalline sub-micron titanium diboride.

4. The material of manufacture as described in claim 1, wherein said material is a mixture of amorphous and crystalline sub-micron titanium diboride.

5. The material of manufacture as described in claim 1, wherein said material has a surface area of greater than about 25 $m^2/g$.

UNITED STATES PATENT AND TRADEMARK OFFICE
CERTIFICATE OF CORRECTION

PATENT NO. : 5,160,716
DATED : November 3, 1992
INVENTOR(S) : Kathryn V. Logan

It is certified that error appears in the above-indentified patent and that said Letters Patent is hereby corrected as shown below:

On the Title page, item [54] and col. 1, line 1,

In the title:

PROCESS FOR MAKING HIGHLY REACTIVE SUB-MICRON AMORPHOUS TITANIUM DIBORIDE [POWER] POWDER AND PRODUCTS MADE THEREFROM

Signed and Sealed this

Ninth Day of November, 1993

*Attest:*

BRUCE LEHMAN

*Attesting Officer*  *Commissioner of Patents and Trademarks*